"(12) United States Patent
Sisk

(10) Patent No.: US 10,150,071 B2
(45) Date of Patent: Dec. 11, 2018

(54) FILTER GUIDE RING

(71) Applicant: David E Sisk, Bonne Terre, MO (US)

(72) Inventor: David E Sisk, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 268 days.

(21) Appl. No.: 14/121,163

(22) Filed: Aug. 8, 2014

(65) Prior Publication Data
US 2015/0052863 A1 Feb. 26, 2015

Related U.S. Application Data

(60) Provisional application No. 61/959,453, filed on Aug. 23, 2013.

(51) Int. Cl.
*B01D 46/00* (2006.01)
*B01D 46/24* (2006.01)

(52) U.S. Cl.
CPC ...... *B01D 46/0004* (2013.01); *B01D 46/2411* (2013.01); *B01D 46/2414* (2013.01)

(58) Field of Classification Search
CPC ... B01D 46/02–46/521; B01D 46/2411; B01D 46/2414; C02F 1/03; C02F 1/283
See application file for complete search history.

(56) References Cited

U.S. PATENT DOCUMENTS 2,897,005 A    7/1959   Wiltse
2,962,120 A *  11/1960  Lagarias ............ B01D 46/0076
                                                            55/292
3,201,927 A    8/1965   Wachter
3,295,679 A    1/1967   Rosaen
3,300,050 A    1/1967   Perry
3,929,379 A    12/1975  Krambrock
4,207,883 A    6/1980   Shindler
D261,501 S     10/1981  Schenker
4,316,522 A    2/1982   Hirschorn
4,365,980 A    12/1982  Culbert et al.
D273,324 S     4/1984   Brownlee
4,632,682 A    12/1986  Erdmannsdorfer
4,818,398 A    4/1989   Lott et al.
4,871,455 A    10/1989  Terhune et al.
D315,597 S     3/1991   Botheras et al.
5,067,856 A    11/1991  Sisk
5,653,870 A    8/1997   Tsuchiya et al.
D402,024 S     12/1998  Dudley
(Continued)

*Primary Examiner* — Heidi R Kelley
*Assistant Examiner* — Karla Hawkins
(74) *Attorney, Agent, or Firm* — Paul M. Denk

(57) ABSTRACT

A filter guide ring is disclosed which comprises a ring having a top surface, a bottom surface; an inner ring side, and an outer ring side, a first leg having a first short leg portion extending outwardly from the outer ring side, a first elbow connected to the first short leg portion, and a first long leg portion extending upwardly from the first elbow, a second leg having a second short leg portion extending outwardly from the outer ring side, a second elbow connected to the second short leg portion, and a second long leg portion extending upwardly from the second elbow, and a third leg having a third short leg portion extending outwardly from the outer ring side, a third elbow connected to the third short leg portion, and a third long leg portion extending upwardly from the third elbow.

7 Claims, 2 Drawing Sheets

(56) References Cited

U.S. PATENT DOCUMENTS

| | | | |
|---|---|---|---|
| 5,954,849 A * | 9/1999 | Berkhoel | B01D 46/0004 55/498 |
| 6,045,599 A * | 4/2000 | Solberg, Jr. | B01D 46/0004 55/498 |
| D504,943 S | 5/2005 | Dudley | |
| D554,249 S | 10/2007 | Holmgren | |
| D557,788 S | 12/2007 | Eloranta | |
| D579,077 S | 10/2008 | Quintel | |
| D582,002 S | 12/2008 | Suthmann | |
| 7,520,925 B2 | 4/2009 | Sisk et al. | |
| D591,825 S | 5/2009 | Qiuntel | |
| D599,432 S | 9/2009 | Buesseler et al. | |
| D600,775 S | 9/2009 | Schmitt et al. | |
| D638,514 S | 5/2011 | Farley | |
| D652,904 S | 1/2012 | Sisk | |
| 8,657,898 B2 | 2/2014 | Sisk | |
| 2002/0111056 A1 * | 8/2002 | Kawamura | B60R 16/027 439/164 |
| 2003/0234137 A1 | 12/2003 | Buckner | |
| 2005/0178716 A1 | 8/2005 | Suri | |
| 2005/0193695 A1 * | 9/2005 | Holmes | B01D 46/0002 55/482 |
| 2009/0057220 A1 * | 3/2009 | Nauta | C02F 1/003 210/282 |
| 2009/0100813 A1 | 4/2009 | Iddings et al. | |
| 2013/0008844 A1 * | 1/2013 | Merritt | B01D 46/0005 210/439 |

* cited by examiner

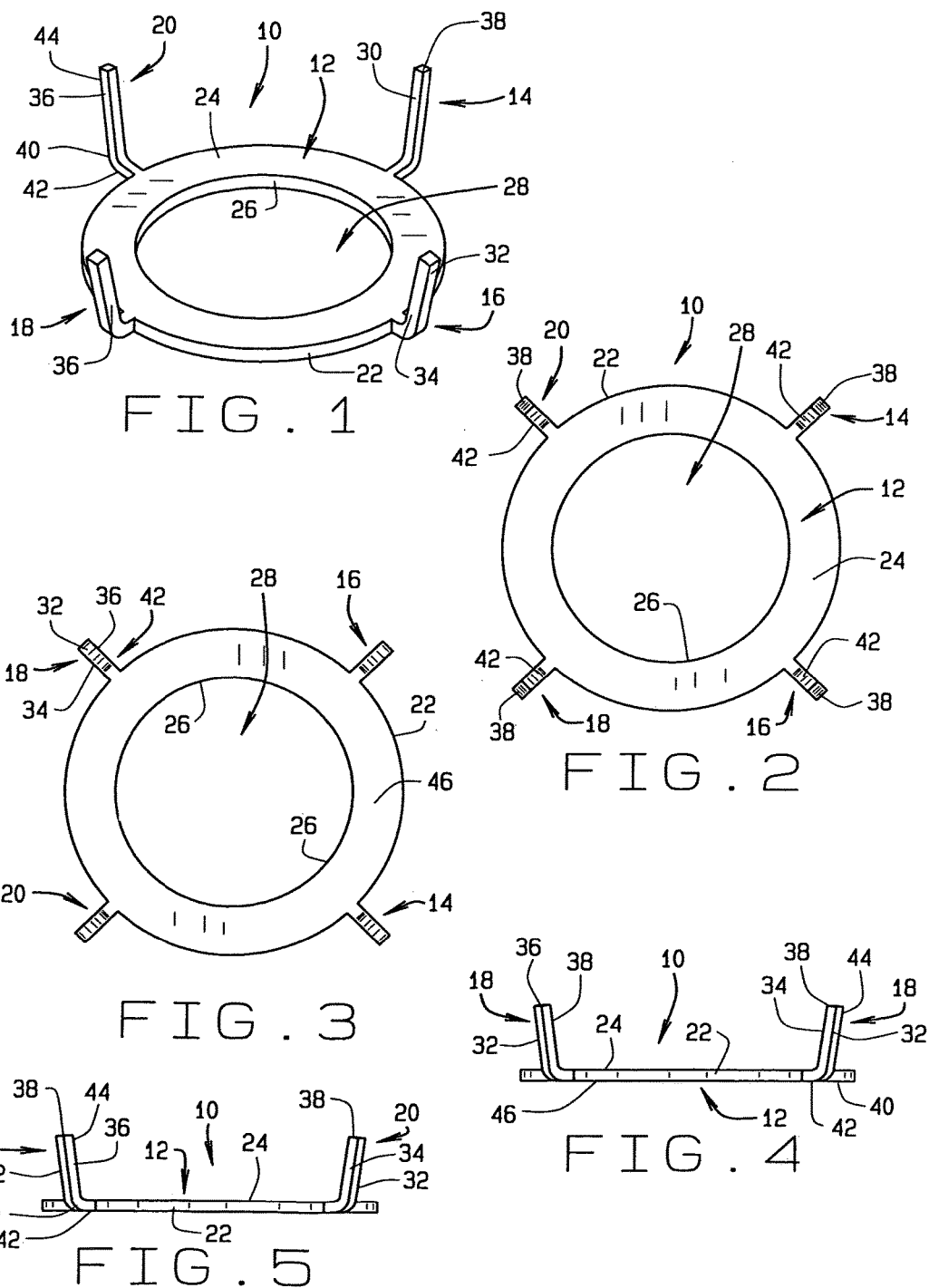

FILTER GUIDE RING

CROSS REFERENCE TO RELATED APPLICATION

This non-provisional patent application claims priority to the provisional patent application having Ser. No. 61/959,453, filed on Aug. 23, 2013, and is a continuation-in-part patent application and claims priority to the non-provisional patent application having Ser. No. 13/200,235, filed on Sep. 22, 2011, now U.S. Pat. No. 8,657,898, which claims priority to the design patent application having Ser. No. 29/373,511, and filed on Apr. 18, 2011, now patent No. D652,904.

FIELD OF THE DISCLOSURE

This disclosure generally relates to a filtering device, and more particularly to a filter guide ring for use with a filtering device which filters moving pressurized air.

BACKGROUND

Granular product, such as grain or corn may be stored and shipped in bulk containers such as railroad tank cars, tank trailers, and pipelines for transportation from one site to be delivered to another site. The delivered product exits from the storage compartment of the transport carrier, such as its tank trailer, and then flows through piping upon the trailer for delivery by hose or further piping to a storage facility or location of usage. In dry bulk hauling, such as of pellets, powders, and grains, the seal integrity at the pipe connection is essential to prevent contamination of the material. It is desirable to provide not only cleansed air that is used in the unloading process, but also to reduce the volume of noise involved in the discharge. The pellets or powders unloaded from gravity gate valves or hoppers located on the bottom of the tank car, exit through tee's that are attached to the bottom of a hopper which normally connect with a collection of pipes, that convey air under pressure to assist in the unloading process. A vacuum or air stream from a pneumatic conveyor system created in the piping system accelerates the unloading of dry bulk products from the hopper.

During the unloading process, the hopper of the tank trailer must be completely emptied of all of the dry bulk product to prevent contamination of any later loads. In addition, not only must the unloading air pressure system be 100% effective in removing the transported cargo, but it is highly necessary that the air itself be reasonably purified, so as not to add any contamination to the discharging bulk granular material, during unloading. Any residue that remains may contaminate subsequent loads or may generate mold or other deleterious substance, which can contaminate subsequent loads.

Presently, the bulk transporting industry favors downloading dry product from tank trailers by pneumatic systems. A pneumatic system begins with a blower mounted to a tractor, such as a truck. When turning at high revolutions per minute, the blower forces air into a discharge pipe that pressurizes the collection pipes below a trailer. The pressurized air then attracts by venturi flow the granular material, by gravity out of the tank trailer, and it is conveyed within the stream of the pressurized flowing air, to the site of storage. The pressurized air then delivers the dry bulk product from the collection pipes to the delivery point, commonly by way of a hose. As known, a typical blower generates much noise, and permits traces of oil, grease, and dirt to enter the discharge pipe. All of these are detrimental. As mentioned above, contamination remains of high concern to dry bulk haulers, particularly where the cargo may be subsequently used in food stuffs or as ingredients to food products. During downloading of dry bulk products, contamination must be lowered, if not eliminated, in ordered to meet food safety standards. In addition, any noise levels generated during unloading must be lowered generally to conform to local noise ordinances.

In order to reduce or eliminate contamination and noise, it is known to use an inline air filter for dry bulk tank trailers. Typically such filter devices have a housing having an inlet, a filter element, a filter guide, and an outlet. The filter guide is used to align the filter element near the outlet to ensure that a proper seal exists between the filter element and the outlet. The filter guide consists of guide wires that are welded in an outlet pipe of the housing in the path of air flow. Over time the guide wires are subject to failure and breakage. Once the guide wires fail and due to the guide wires being in the air path, the wires are sucked into the bulk material being delivered. As can be appreciated, if the bulk material is an ingredient for food, the food becomes contaminated with the guide wires and dangerous if the guide wires are consumed by individuals. Another problem associated with the guide wires is that the wires create an obstruction in the air flow path through the filter element. This may lead to a decrease in the efficiency of the pneumatic system.

The present disclosure is designed to obviate and overcome many of the disadvantages and shortcomings experienced with prior filter guides. Moreover, the present disclosure is related to a filter guide ring that eliminates the possibility of the filter guide contaminating product or having any guide wires in the air flow path.

SUMMARY OF THE DISCLOSURE

The present disclosure is directed to a filter guide ring which comprises a ring having a top surface, a bottom surface; an inner ring side, and an outer ring side, a first leg having a first short leg portion extending outwardly from the outer ring side, a first elbow connected to the first short leg portion, and a first long leg portion extending upwardly from the first elbow, a second leg having a second short leg portion extending outwardly from the outer ring side, a second elbow connected to the second short leg portion, and a second long leg portion extending upwardly from the second elbow, and a third leg having a third short leg portion extending outwardly from the outer ring side, a third elbow connected to the third short leg portion, and a third long leg portion extending upwardly from the third elbow.

In light of the foregoing comments, it will be recognized that the present disclosure provides a filter guide ring that is not in the air flow path of a pneumatic system.

The present disclosure provides a filter guide ring that can be easily employed with highly reliable results in a pneumatic system which is used to unload cargo from a storage unit under the influence of moving pressurized air to move the cargo to a different location.

The present disclosure further provides a filter guide ring for use in a filtering device having a housing having an inlet end and an outlet end with both of the ends being located at the same end of the housing to make it convenient for connecting to an incoming air line or a line from an air pump. An outlet line for pressurized and filtered air, which is positioned underneath a tank trailer or hopper car, draws granular materials stored therein to be provided to another location for either usage or storage.

The present disclosure provides a filter guide ring that is easy to learn how to operate and does not require any advanced or special training.

The present disclosure provides a filter guide ring which maintains a filter element centrally within a housing of a filtering device so as to avoid any disruption in the flow of air that passes through the filter element.

The present disclosure provides a filter guide ring that assists in sealing a filter element within a housing of a filtering device so as to avoid any leakage of air or a decrease in the efficiency of the filtering device.

The present disclosure also provides a filter guide ring that is constructed of relatively few parts or components, but attains far more significantly beneficial results, than what is provided using currently available devices.

The present disclosure further provides a filter guide ring that is used in a filtering device to filter pressurized air in a bulk tank discharge system to provide effective and efficient operations of the discharge system during discharge of its load at the site of delivery.

These and other advantages of the present disclosure will become apparent to those skilled in the art after considering the following detailed specification in conjunction with the accompanying drawings.

BRIEF DESCRIPTION OF THE DRAWINGS

In referring to the drawings:

FIG. 1 is a perspective view of a filter guide ring constructed according to the present disclosure;

FIG. 2 is a top view of the filter guide ring shown in FIG. 1;

FIG. 3 is a bottom view of the filter guide ring shown in FIG. 1;

FIG. 4 is a front view of the filter guide ring shown in FIG. 1;

FIG. 5 is a rear view of the filter guide ring shown in FIG. 1; and

DETAILED DESCRIPTION OF PREFERRED EMBODIMENTS

Figure 6:
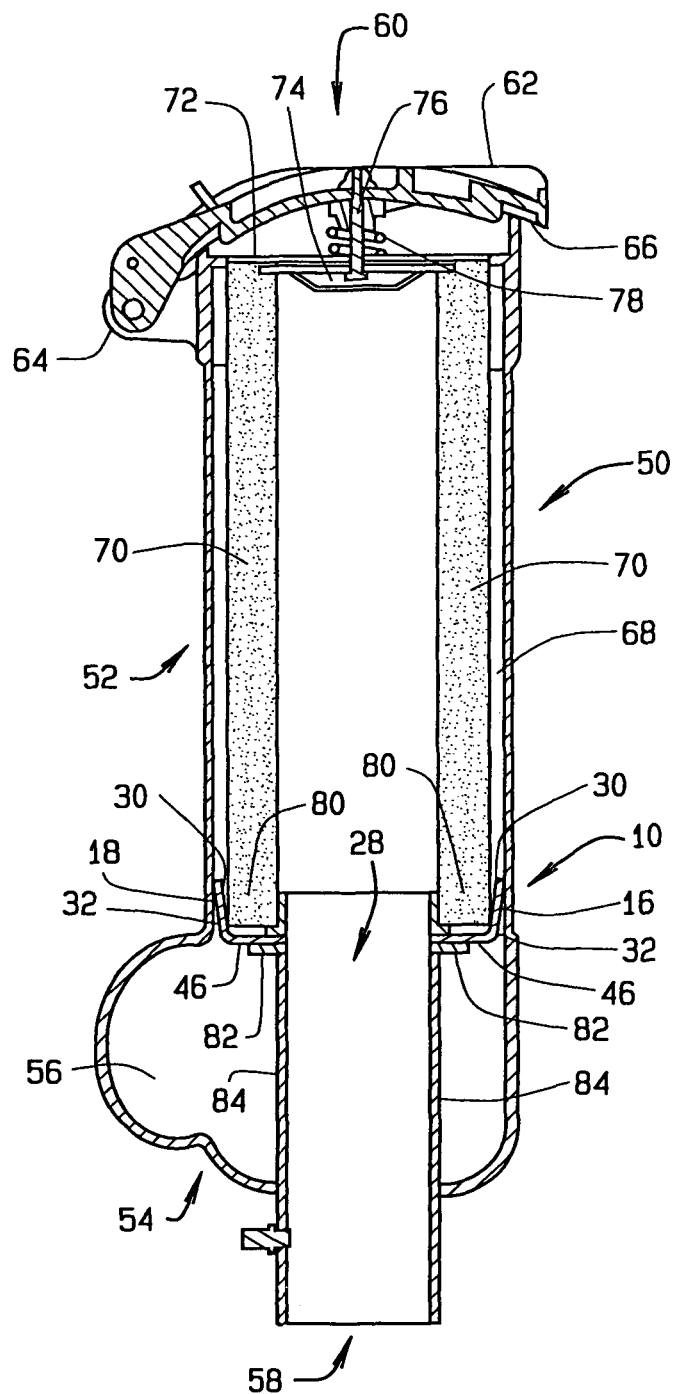
FIG. 6 is cross sectional view of the filter guide ring installed in a filtering device.

Referring now to the drawings, wherein like numbers refer to like items, number 10 identifies a preferred embodiment of a filter guide ring constructed according to the present disclosure. With reference now to FIG. 1, the filter guide ring 10 comprises an annular ring 12 having four legs 14, 16, 18, and 20 extending outwardly and upwardly from an outer ring side 22 of the ring 12. The ring 12 has a top surface 24 and an inner ring side 26. The inner ring side 26 forms a central opening 28 through which air may pass or flow. Each of the legs 14, 16, 18, and 20 has an inner leg surface 30, an outer leg surface 32, a first side surface 34, a second side surface 36, and a top surface 38. Each of the legs 14, 16, 18, and 20 has an elbow section 40 connected between a short leg section 42 and a long leg section 44. The short leg section 42 is connected or formed from the outer ring side 22. The short leg section 42 extends outwardly and the long leg section 44 extends upwardly. The legs 14, 16, 18, and 20 are positioned equally around the outer ring side 22 of the ring 12. In other words, the leg 14 is spaced 90° away from the leg 16 and the leg 20. Although the legs 14, 16, 18, and 20 are shown as being equally spaced apart about the ring 12, it is possible that the legs 14, 16, 18, and 20 may be spaced unequally apart depending upon the particular application.

FIG. 2 shows a top perspective view of the filter guide ring 10. The filter guide ring 10 has the legs 14, 16, 18, and 20 extending outwardly at the short leg sections 42 from the outer ring side 22. Each top surface 38 is also shown having a generally rectangular or square configuration. The ring 12 has an annular shape and generally has an O shape. The top surface 24 is formed between the outer ring side 22 and the inner ring side 26. The central opening 28 is formed within the inner ring side 26 and provides an opening for air to flow through, as will be discussed more fully herein.

Referring now to FIG. 3, a bottom view of the filter guide ring 10 is illustrated. The filter guide ring 10 has a bottom surface 46 formed between the outer ring side 22 and the inner ring side 26. The bottom surface 46 has an annular shape and is generally an O shape. Each of the legs 14, 16, 18, and 20 extend outwardly from the bottom surface 46 and the outer ring surface 22. The leg 18 is shown having the outer leg surface 32, the first side surface 34, the second side surface 36, and the short leg portion 42. The central opening 28 is depicted being formed within the inner ring side 26.

FIG. 4 depicts a front view of the filter guide ring 10. The filter guide ring 10 has the ring 12 showing two of the legs 16 and 18 extending outwardly and upwardly from the outer ring side 22. The ring 12 has the top surface 24 and the bottom surface 46. The leg 16 shows the outer leg surface 32, the first side surface 34, and the top surface 38. While the leg 18 shows the outer leg surface 32, the second side surfaces 36, and the top surface 38. The elbow section 40 is connected between the short leg section 42 and the long leg section 44. The short leg section 42 extends outwardly from the outer ring side 22 and the long leg section 44 extends upwardly from the elbow section 40. In general, the legs 16 and 18 are L or J shaped.

With reference not to FIG. 5, a rear view of the filter guide ring 10 is shown. The filter guide ring 10 has the ring 12 showing the other two legs 14 and 20 extending outwardly and upwardly from the outer ring side 22. The ring 12 is illustrated having the top surface 24 and the bottom surface 46. The leg 14 shows the outer leg surface 32, the second side surface 36, and the top surface 38. While the leg 20 shows the outer leg surface 32, the first side surfaces 34, and the top surface 38. The elbow section 40 is connected between the short leg section 42 and the long leg section 44. The short leg section 42 extends outwardly from the outer ring side 22 and the long leg section 44 extends upwardly from the elbow section 40. The legs 14 and 20 are generally L or J shaped.

FIG. 6 is a cross sectional view of a filtering device 50 having the filter guide ring 10 installed therein. The filtering device 50 comprises a housing 52 that has a front end 54 having an air intake or inlet chamber 56 and an air outlet 58. The air outlet 58 is provided longitudinally and axially centrally of the housing 52. The air outlet 58 directs air pumped into the air intake 56 out through an outlet air line (not shown) that assist in the removal of granular material from a tank trailer, or hopper car, or any other conveying and storage vehicle during operation of the filtering device 50. The filtering device 50 has a back end 60 having a door 62 that is pivotally connected to the housing 52 by use of a pivot mechanism 64. The door 62 is held or locked in place to the housing 52 by a cam lever 66. The cam lever 66 may be unlatched when access into the housing 52 is required.

The housing 52 has an interior chamber 68 within which is positioned a filter element 70. The filter element 70 has a back 72 which is positioned against the door 62 and a contoured plate 74. The contoured plate 74 is biased between the door 62 and the filter element 70 by a pin mount 76 supporting a spring 78. The contoured plate 74 centers the filter element 70 in position axially within the housing 52. The filter element 70 has a front 80 which is positioned against the filter guide ring 10 that has been inserted into the interior chamber 68 of the housing 52. The filter guide ring 10 is placed on a flange 82 attached to a pipe or conduit 84 that forms the air outlet 58. The filter guide ring 10 has the bottom surface 46 placed against the flange 82. The front 80 of the filter element 70 is positioned against the top surface 24 of the ring 12. The inner leg surfaces 30 are also in contact with the front 80 of the filter element 70. Cross sectional views of the legs 16 and 18 are shown in this particular view. The outer leg surfaces 32 may contact the interior chamber 68 of the housing 52. The legs 14, 16, 18, and 20 provide for alignment of the filter element 70 within the interior chamber 68 of the housing 52. The filter guide ring 10 also provides for proper sealing of the front 80 of the filter element 70 to the air outlet 58. The filter guide ring 10 and the contoured plate 74 are used to fix or retain the filter element 70 in place, axially and longitudinally aligned within the housing 52 of the filtering device 50.

In the event that one or more of the legs 14, 16, 18, or 20 breaks from the ring 12, the legs 14, 16, 18, or 20 will be trapped within the interior chamber 68 between the housing 52 and the filter element 70. The leg 14, 16, 18, or 20 that breaks from the ring 12 will not be able to enter into the air outlet 58 to contaminate product being transferred from a storage tank. Also, the central opening 28 does not obstruct any air that flows from the air inlet 56 through the interior chamber 68 and the filter element 70 and out through the air outlet 58. The filter guide ring 10 does not have to be welded to the housing 52. In view of this, the filter guide ring 10 may be formed of stainless steel. This will add to the life of the filter guide ring 10.

Due to the particular configuration of the air inlet 56, air that is pumped into the air inlet 56 will swirl into a spiraling pattern and flow around the filter element 70 positioned within the housing 52. The spiraling pattern allows air to enter into the filter element 70 along the entire length of the filter element 70 to provide for effective filtering of the incoming air and the incoming air is not focused at any one isolated location along the filter element 70. More efficient filtration of the air can be achieved for a much more sustained period of time, which means that the filtering device 50 can be used for a much greater length of time, before the filter element 70 either needs to be cleaned or replaced, as compared to currently available devices.

As can be appreciated, the filter element 70 can be of any type of filter that may be normally employed for use for air filtering purposes. The filter element 70 may be a pleated filter element, a strengthened fluted paper filter, or any other type of air filter. It is also possible that a polymer type of filter, one made of microcellular urethane foam, and which provides for fine filtration of miniscule particles, may be used. The filter element 70 may also be made of metal or other polymer or a combination of materials. The filter element 70, as shown schematically in FIG. 6, is simply to identify the location of the filter element 70 with respect to the filter guide ring 10, without reference to its usable structure.

Once the air is filtered by the filtering device 50, the air passes directly out of the air outlet 58 for flow into an outlet pipe that is connected to the filtering device 50. The filtered air then cooperates with an outlet tee at a bottom of a tank trailer hopper, or the like, to draw granular material out of a tank trailer where the granular material has been stored. The granular material is then conveyed along the length of the outlet conduit for delivery for usage or storage at an unloading site.

The housing 52 is generally cylindrical in shape and allows the cylindrical shaped filter element 70 to be inserted therein when the door 62 is opened. In order to seal the front 80 of the filter element 70, the front 80 is guided by the filter guide ring 10. The filter guide ring 10 ensures that the filter element 70 is aligned within the housing 52. Once the filter element 70 is in place, the door 62 is closed and latched by use of the cam lever 66. In the event that the filter element 70 needs to be replaced, the door 62 is opened and the filter element 70 is removed.

As previously indicated, the filter guide ring 10 assures that the filter element 70 remains axially arranged longitudinally along the length of the housing 52. The filter guide ring 10 also insures that the filter element 70 will be sealed to the air outlet 58. Circulating air will pass through the filter element 70 and the central opening 28 of the filter guide ring 10 and allow to flow unobstructed to the air outlet 58. The legs 14, 16, 18, and 20 are not in the path of the filtered air. Should one or more of the legs 14, 16, 18, or 20 ever break away from the ring 12; the legs 14, 16, 18, and 20 will be trapped within the housing 52 and not be allowed to flow to the air outlet 58.

Although four legs 14, 16, 18, and 20 have been shown and described, it is possible and contemplated that more or less legs may be formed from or attached to the ring 12. For example, there may be situations when three legs are sufficient to guide the filter element 70 in place. Also, there may be applications where six legs will be required. As indicated, these are listed only for purposes of providing examples of the various configurations and applications for the filter guide ring 10 of the present disclosure. Also, although the legs 14, 16, 18, and 20 have been depicted and discussed as having a generally rectangular shape or cross section, it is possible that the legs 14, 16, 18, and 20 may have other suitable shapes, sizes, or configurations.

From all that has been said, it will be clear that, there has thus been shown and described herein a filter guide ring. It will become apparent to those skilled in the art, however, that many changes, modifications, variations, and other uses and applications of the subject filter guide ring are possible and contemplated. All changes, modifications, variations, and other uses and applications which do not depart from the spirit and scope of the disclosure are deemed to be covered by the disclosure, which is limited only by the claims which follow.

What is claimed is:

1. A filter guide ring for use in an air filtering device for conveying pressurized filtered air through a conveying pipe to assist in removal of granular material from a tank trailer or hopper car, comprising:

said air filtering device including a housing, said housing have an intake and an outlet, both said intake and outlet disposed at the same end of said housing;

a filter provided in said housing for filtering of air passing therethrough, and said filter guide ring provided at the same intake and outlet end of said housing, and said filter guide ring fitting within the intake and outlet end of said housing, said filter guide ring comprising an annulus with a center opening therethrough, and through which the air passes when traversing to the outlet of said housing, said filter guide ring having an outer ring side and an inner ring side;

said filter being cylindrical and having an outer surface and an inner surface, and the air moving towards the outlet passing along the said inner surface of the said filter;

said filter guide ring having a series of legs with each leg comprising a short leg portion integrally extending outwardly from the outer ring side, an elbow section, and a long leg section extending upwardly from the elbow section with each long leg section having an inner leg surface, and each long leg section positioned between said housing and the filter and establishing a space there between and each inner leg surface contacting the outer surface of the filter;

wherein said guide ring annulus forms a central opening through which air passes towards the outlet;

wherein each of the short leg portions integrally extending from the outer ring side of the filter guide ring and being spaced substantially apart equally around the outer ring side;

whereby the air enters through the intake and then passes through the said first short leg portions and within the space between the filter and the housing, for passing through said filter, and for moving in an opposite direction through said cylindrical filter and through said annulus of said filter guide ring to the outlet from the housing for attaining passage of the filtered pressurized air through a conveying pipe for removal of granular material from a tank trailer or hopper car through movement of the pressurized air.

2. The filter guide ring of claim 1 wherein the filter guide ring is formed of stainless steel.

3. The filter guide ring of claim 1 wherein each of the legs is J shaped.

4. The filter guide ring of claim 1 wherein each of the legs is rectangular in shape.

5. The filter guide ring of claim 1 wherein the legs are spaced apart equally around the outer ring side of the filter guide ring.

6. The filter guide ring of claim 1 wherein each long leg section further comprises an outer leg surface, a first leg surface, a second leg surface, and a top surface.

7. The filter ring guide of claim 1, for use in an air filtering device used in the removal of granular material from a tank trailer or hopper car, wherein said filter guide ring is provided at the same intake and outlet end of its housing, and including a door, provided at the opposite end of said housing, and which when removed providing for access into the housing for the insertion or removal of the filter therefrom during servicing.

* * * * *